US006957315B2

(12) United States Patent
Chauvel

(10) Patent No.: US 6,957,315 B2
(45) Date of Patent: Oct. 18, 2005

(54) TLB LOCK AND UNLOCK OPERATION

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 333 days.

(21) Appl. No.: 09/932,382

(22) Filed: Aug. 17, 2001

(65) Prior Publication Data

US 2002/0069327 A1 Jun. 6, 2002

(30) Foreign Application Priority Data

Aug. 21, 2000 (EP) .......................................... 00402331
May 11, 2001 (EP) .......................................... 01401216

(51) Int. Cl.[7] .............................................. G06F 12/00
(52) U.S. Cl. ..................... 711/207; 711/205; 711/156; 711/163; 711/164
(58) Field of Search ............................... 711/206, 207, 711/144, 145, 156, 163, 164, 205, 158, 151, 118

(56) References Cited

U.S. PATENT DOCUMENTS

| | | | | |
|---|---|---|---|---|
| 4,589,092 A | * | 5/1986 | Matick | 711/207 |
| 4,638,426 A | * | 1/1987 | Chang et al. | 711/216 |
| 4,965,717 A | * | 10/1990 | Cutts et al. | 714/12 |
| 5,146,589 A | * | 9/1992 | Peet et al. | 714/3 |
| 5,636,363 A | * | 6/1997 | Bourekas et al. | 711/138 |
| 5,640,533 A | | 6/1997 | Hays et al. | |
| 5,860,147 A | | 1/1999 | Gochman et al. | |
| 5,899,994 A | * | 5/1999 | Mohamed et al. | 707/100 |
| 5,940,872 A | * | 8/1999 | Hammond et al. | 711/207 |
| 6,029,000 A | * | 2/2000 | Woolsey et al. | 717/147 |
| 6,182,089 B1 | * | 1/2001 | Ganapathy et al. | 707/206 |
| 6,189,056 B1 | * | 2/2001 | Ogura et al. | 710/62 |
| 6,374,341 B1 | * | 4/2002 | Nijhawan et al. | 711/207 |
| 6,564,311 B2 | * | 5/2003 | Kakeda et al. | 711/207 |
| 2001/0021969 A1 | * | 9/2001 | Burger et al. | 711/207 |
| 2002/0073282 A1 | * | 6/2002 | Chauvel et al. | 711/122 |

FOREIGN PATENT DOCUMENTS

| | | | | |
|---|---|---|---|---|
| EP | 1182559 A1 | * | 2/2002 | G06F/12/08 |
| EP | 1182569 A1 | * | 2/2002 | G06F/12/10 |

* cited by examiner

Primary Examiner—Hong Kim
(74) Attorney, Agent, or Firm—Robert D. Marshall, Jr.; W. James Brady, III; Frederick J. Telecky, Jr.

(57) ABSTRACT

A digital system and method of operation is provided in which several processing resources (340) and processors (350) are connected to a shared translation lookaside buffer (TLB) (300, 310(n)) of a memory management unit (MMU) and thereby access memory and devices. These resources can be instruction processors, coprocessors, DMA devices, etc. Each entry location in the TLB is filled during the normal course of action by a set of translated address entries (308, 309) along with qualifier fields (301, 302, 303) that are incorporated with each entry. Operations can be performed on the TLB that are qualified by the various qualifier fields. A command (360) is sent by an MMU manager to the control circuitry of the TLB (320) during the course of operation. Commands are sent as needed to flush (invalidate), lock or unlock selected entries within the TLB. Each entry in the TLB is accessed (362, 368) and the qualifier field specified by the operation command is evaluated (364). This can be task ID field 302, resource ID field 301, shared indicator 303, or combinations of these. Operation commands can also specify a selected virtual address entry (305). Each TLB entry is modified in response to the command (366) only if its qualifier field(s) match the qualifier(s) specified by the operation command.

13 Claims, 10 Drawing Sheets

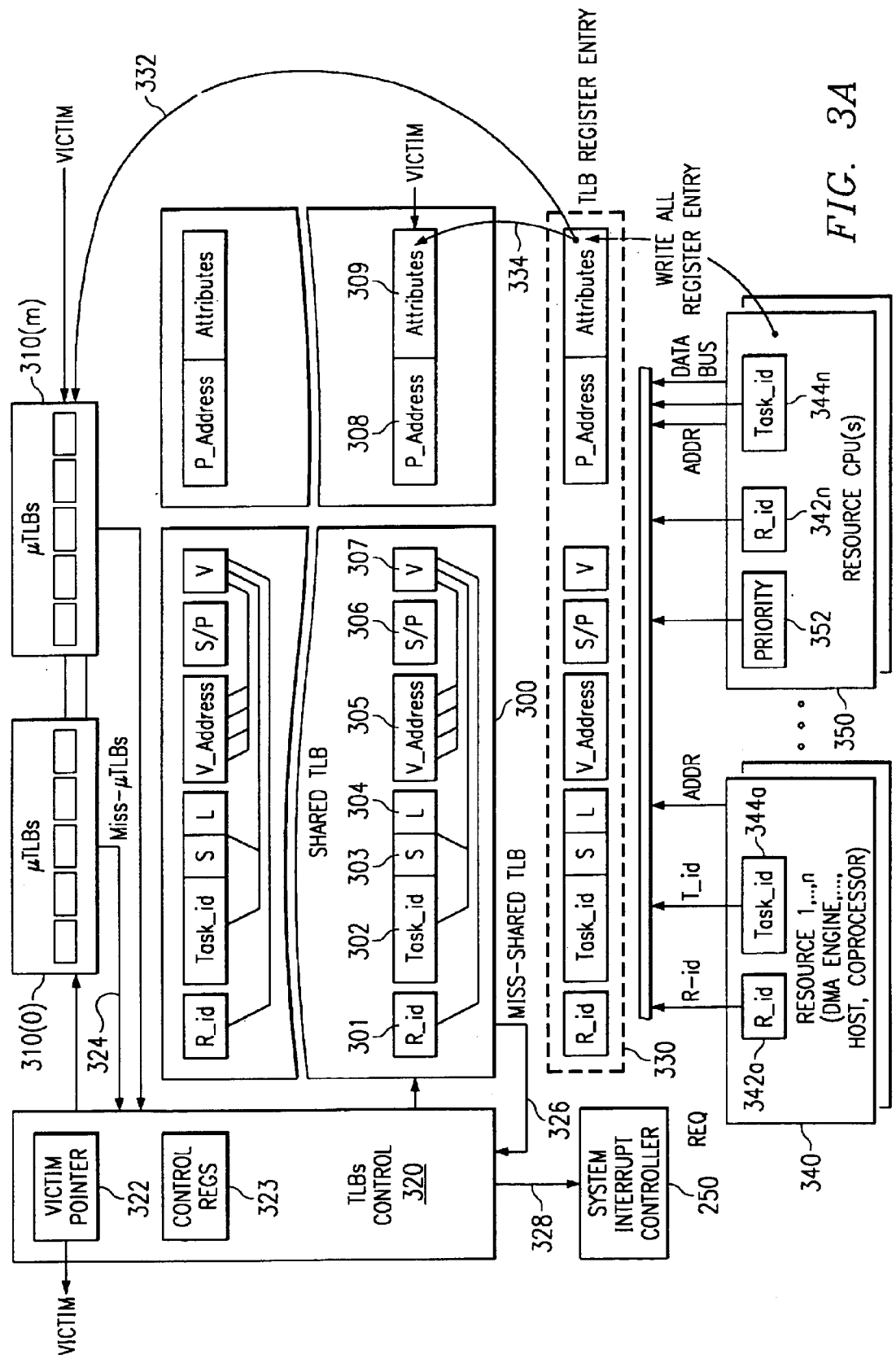

US 6,957,315 B2

TLB LOCK AND UNLOCK OPERATION

This application claims priority to European Application Serial No. 00402331.3, filed Aug. 21, 2000 (TI-31366EU) and to European Application Serial No. 01401216.5, filed May 11, 2001. U.S. patent application Ser. No. 09/932,651 is incorporated herein by reference.

CO-RELATED APPLICATIONS

This application is related to patent application Ser. No. 09/932,397 entitled TLB Operation Based on Task-ID; patent application Ser. No. 09/932,319, entitled TLB Operations Based on Shared Bit; and patent application Ser. No. 09/932,611, entitled TLB with Resource ID Field.

FIELD OF THE INVENTION

This invention generally relates to computer processors, and more specifically to improvements in translation lookaside buffers for address translation, systems, and methods of making.

BACKGROUND

Microprocessors are general purpose processors which provide high instruction throughputs in order to execute software running thereon, and can have a wide range of processing requirements depending on the particular software applications involved.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

Modular programming builds a computer program by combining independently executable units of computer code (known as modules), and by tying modules together with additional computer code. Features and functionality that may not be provided by a single module may be added to a computer program by using additional modules.

The design of a computer programming unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command. A computer program may be processed (also called "run" or "executed") in a variety of manners. One manner is to process the computer code sequentially, as the computer code appears on a written page or on a computer screen, one command at a time. An alternative manner of processing computer code is called task processing. In task processing, a computer may process computer code one task at a time, or may process multiple tasks simultaneously. In any event, when processing tasks, it is generally beneficial to process tasks in some optimal order.

Unfortunately, different tasks take different amounts of time to process. In addition, the result, output, or end point of one task may be required before a second task may begin (or complete) processing. Furthermore, particularly in a multiple processor environment, several tasks may need access to a common resource that has a generally fixed capacity.

In order to better manage program tasks and physical memory, a concept of virtual memory and physical memory has evolved. Program task modules are generally compiled and referenced to virtual address. When a task is executed in physical memory, address translation is performed using a cache of translated addresses, referred to as a translation lookaside buffer (TLB). TLBs must be managed to optimize system performance as various tasks are executed.

Accordingly, there is needed a system and method for managing task processing and address translation that takes into account active tasks, active resources, and other task processing needs.

SUMMARY OF THE INVENTION

Particular and preferred aspects of the invention are set out in the accompanying independent and dependent claims. In accordance with a first embodiment of the invention, a method is provided for operating a digital system having a processor and associated translation lookaside buffer (TLB). Several program tasks are executed within the processor that initiate a sequence of memory access requests in response to the program tasks. In response to the sequence of memory access requests, a set of translated memory addresses are cached in the TLB. A task identification value is incorporated with each translated memory address to identify which of the program tasks requested the respective translated memory address.

A portion of the set of translated memory address in the TLB is locked or unlocked in a manner that is qualified by the task identification value, such that only an entry belonging to a selected program task in the set of translated memory addresses is affected.

In an embodiment of the invention, the TLB has several levels, and the step of locking or unlocking encompasses all of the levels of the TLB.

In another embodiment, a selected victim translated memory address is replaced with a different translated memory address, in a manner that the victim translated memory address is selected only from a portion of the set of translated memory addresses in the TLB that is not locked.

In another embodiment, one or more TLB locations are reserved from being locked.

Another embodiment of the invention is a digital system that has a translation lookaside buffer (TLB). The TLB includes storage circuitry with a set of entry locations for holding translated values, wherein each of the set of entry locations includes a first field for a translated value and a second field for an associated qualifier value. There is a set of inputs for receiving a translation request, a set of outputs for providing a translated value selected from the set of entry locations; and control circuitry connected to the storage circuitry. The control circuitry is responsive to an operation command to lock or unlock selected ones of the set of entry locations that have a first qualifier value in the second field.

In another embodiment, the control circuitry includes a shift register connected to the storage circuitry for selecting a next victim entry location and skip circuitry connected to the shift register and to the storage circuitry. The skip circuitry is operable to cause the shift register to skip over locked entry locations.

In another embodiment, the control circuitry includes reservation circuitry operable to reserve a portion of the entry locations from being locked.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIG. 3A is a block diagram illustrating a shared translation lookaside buffer (TLB) and several associated micro-TLBs ($\mu$TLB) included in the megacell of FIG. 2;

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
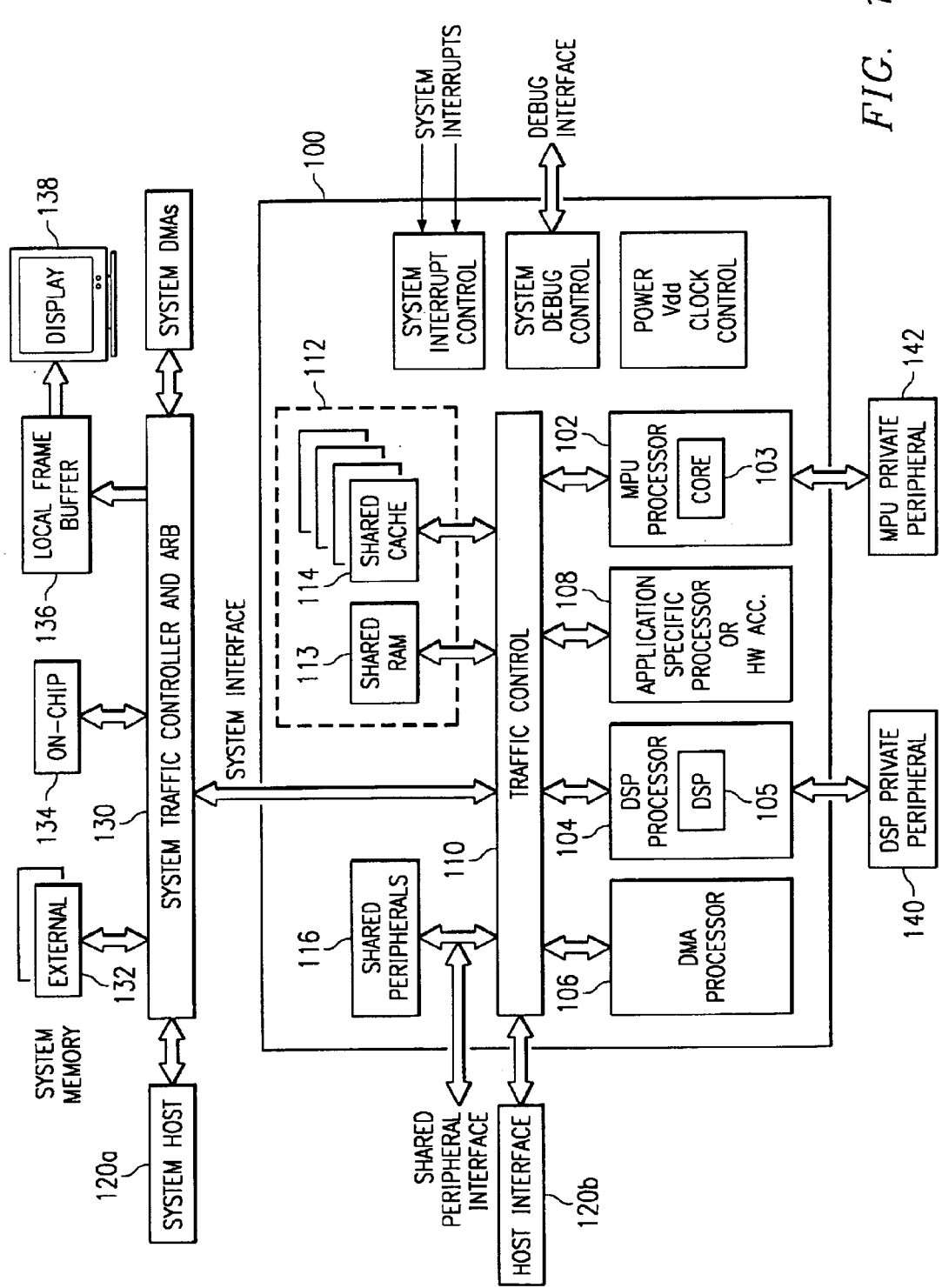
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
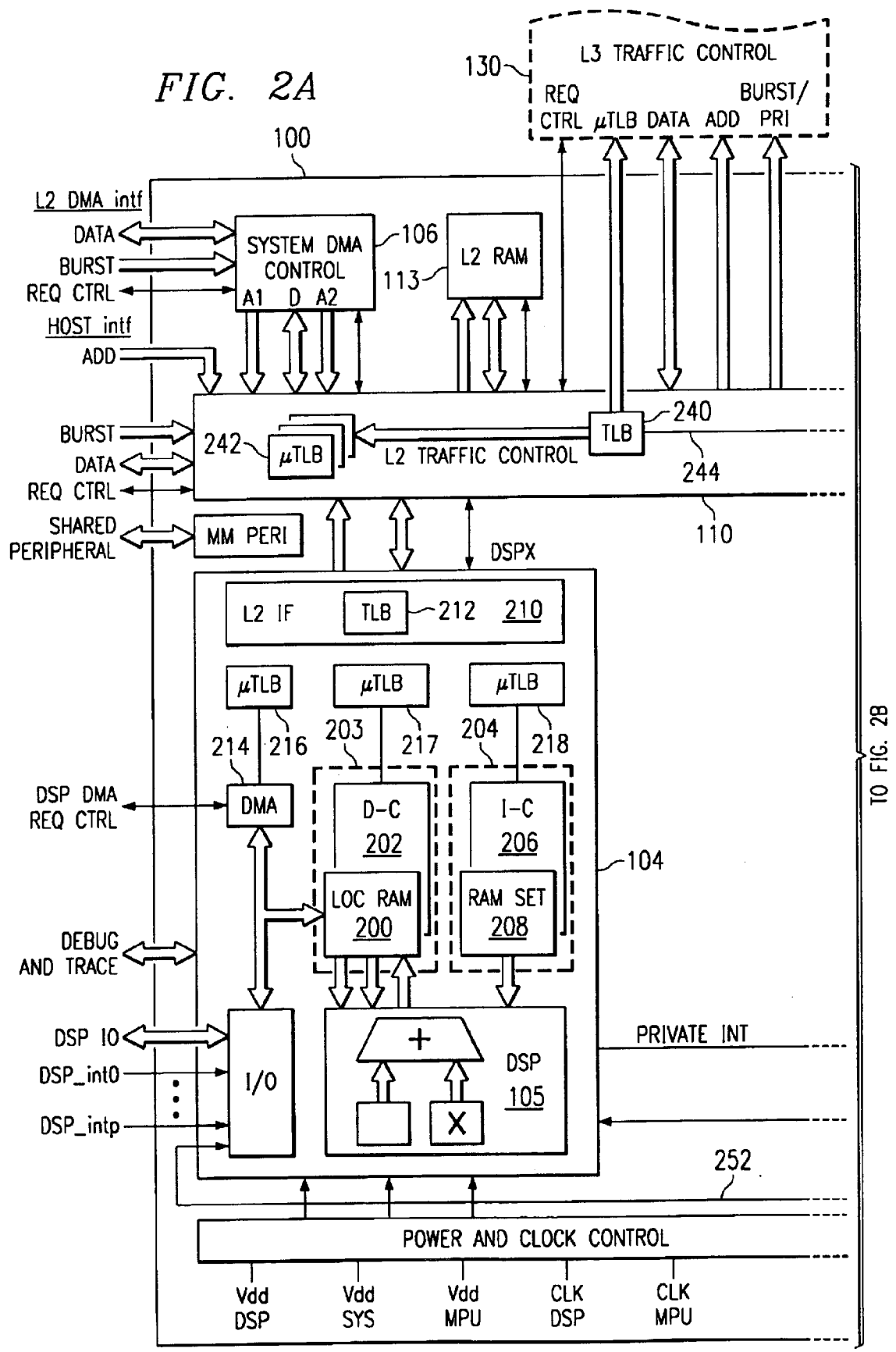
FIGS. 2A and 2B together is a more detailed block diagram of the megacell core of FIG. 1.
Figure 2B:
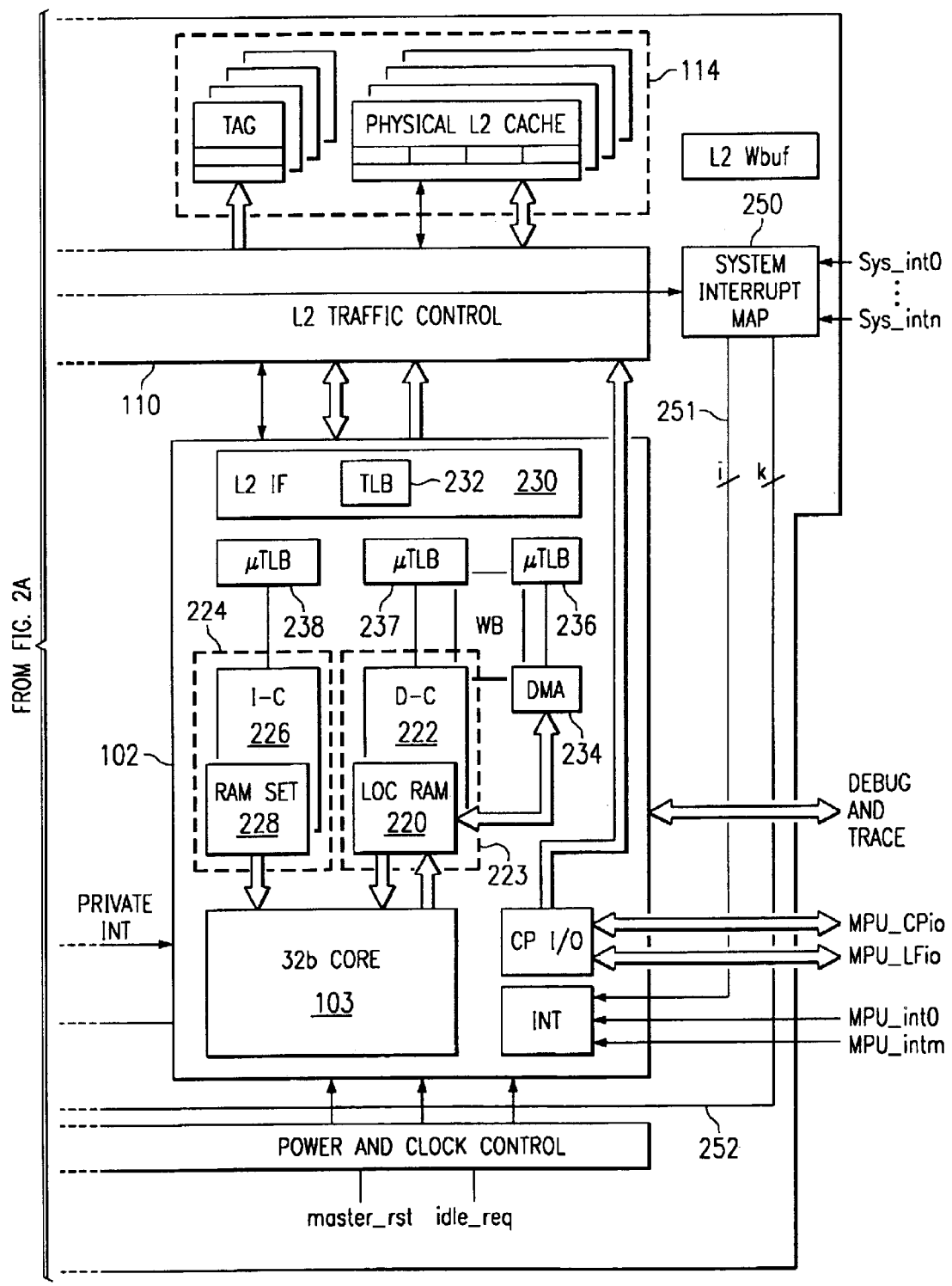

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation lookaside buffer (TLB) 212. A DMA circuit 214 is also included within the DSP. Individual micro TLBs ($\mu$TLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236–238 are associated with the DMA circuit, data cache and instruction cache, respectively.

L2 traffic controller 110 includes a TLB 240 and one or more micro-TLB (μTLB) 242 that are associated with system DMA block 106, host processor interface 120b for a host connected at level two, and other application specific hardware accelerator blocks. Similarly, L3 traffic controller 130 includes a μTLB controllably connected to TLB 240 that is associated with system host 120a at level three. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later. Each MMU includes a TLB and its associated μTLBs.

The translation lookaside buffer (TLB) caches contain entries for virtual-to-physical address translation and page descriptor information such as access permission checking, cache policy for various levels, etc. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, an exception is generated that initiates a translation table walk software routine. The TLB miss software handler retrieves the translation and access permission information from a translation table in physical memory. Once retrieved, the page or section descriptor is stored into the TLB at a selected victim location. Victim location selection is done by software or with hardware support, as will be described later.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

Translation tables and TLB cache contents must be kept consistent. A flush operation is provided for this reason and will be described in more detail later.

An address reference is generally located within the μTLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/μTLB corresponding to a selected task.

As part of the page descriptor information, the MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provide additional information, such as memory access permission and access priority as described later.

All megacell memory accesses are protected by a TLB. As they all have different requirements in term of access frequencies and memory size, a shared TLB with individual μTLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

The present embodiment has a distributed operating system (OS) with several domains corresponding to each processor but only a single table manager for all processors. Slave processors do not manage the tables. In a first embodiment slave processors R-ID are equal to the R-ID of the master CPU. In another embodiment, they could, however, have a different R-ID to control their TLB entries lock/unlock entries corresponding to some of their own tasks or flush all their entries, when putting themselves in sleep mode to free entries for the others processors. Having different R-ID provides a means to increase security in a concurrent multi-processor environment, processor X can not access memory allocated to processor Y.

In another embodiment with several independent OS(s), for example, there will be independent tables. These tables can be located in a memory space only viewed by the OS that they are associated with in order to provide protection from inadvertent modification by another OS. As they manage the virtual memory and task independently, the R-ID provides the necessary inter-processor security. R-Ids are managed by a single master CPU. This CPU can make TLB operations on all TLB entries. TLB operation or memory accesses from slave processor are restricted by their own R-ID. The CPU master will have rights to flush out entries belonging to another processor in a different OS domain.

The organization of the data structures supporting the memory management descriptor is flexible since each TLB miss is resolved by a software TLB-miss handler. These data structures include the virtual-to-physical address translation and all additional descriptors to manage the memory hierarchy. A list of these descriptors and their function is described in Table 2. Table 1 includes a set of memory access permission attributes, as an example. In other embodiments, a processor may have other modes that enable access to memory without permission checks.

TABLE 1

Memory Access Permission

| Supervisor | User |
|---|---|
| No access | No access |
| Read only | No access |
| Read only | Read only |
| Read/Write | No access |
| Read/Write | Read only |
| Read/Write | Read/Write |

TABLE 2

Memory Management Descriptors

| | |
|---|---|
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |
| Endianism | determine on a page basis the endianness of the transfer. |
| priority | Indicates a priorty level for the associated memory address region. Memory access can be prioritized based on this priority value. |

MMU/TLB Control Operation

FIG. 3A is a block diagram illustrating a shared translation look-aside buffer (TLB) 300 and several associated micro-TLBs ($\mu$TLB) 310(0)–310(m) included in megacell 100 of FIG. 2. On a $\mu$TLB miss, the shared TLB is first searched. TLB controller 320 is alerted by asserting a $\mu$TLB miss signal 324. In case of a hit on the shared TLB, the $\mu$TLB that missed is loaded with the entry content of the shared TLB 300. In the case of a miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting $\mu$TLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, other uTLBs associated with other modules can continue to access the shared TLB while the TLB entry register is being loaded, until a second miss occurs. Advantageously, by controlling access to the TLB via the TLB entry register, CPUs have no direct access to TLB cache internal structure and thus the risk of partial modifications inconsistent with the MMU tables is avoided.

The sequence of operations to update a TLB cache entry after a miss is:

1—the software TLB handler writes to the TLB entry register,

2—the software TLB handler sends a command to write the TLB entry, which transfers a value from TLB entry register to a preselected victim TLB cache entry; and 3—control circuitry checks and preselects a next victim TLB entry, in preparation for the next miss. In this embodiment, this step is generally performed in background prior to the occurrence of a miss.

Advantageously, TLB cache entries can be preemptively updated under OS software control to prevent TLB miss by pre-loading a new entry, using the following sequence of operation:

1—control circuitry checks and selects a TLB entry, referred to as a victim TLB cache entry.

2—the software TLB handler writes to the TLB entry register, and

3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and $\mu$TLB to provide a victim separate pointer for each. A typical embodiment will use a round robin scheme. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB, for example.

In this embodiment, each shared TLB has 256 entries. Each $\mu$TLB is generally much smaller, i.e., has fewer entries, than the shared TLB. In various embodiments, each shared TLB has 64–256 or more entries while $\mu$TLBs generally have 4–16 entries. The penalty for a miss in a $\mu$TLB is small since a correct entry is generally available from the shared TLB. Therefore, the present embodiment does not provide direct control of the victim pointers of the various $\mu$TLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. Resource IDs are provided by a resource-ID register associated with each resource; such as R-ID register 342a associated with resource 340 and R-ID register 342n associated with resource 350. Resource 340 is representative of various DMA engines, coprocessor, etc within megacell 100 and/or an external host connected to megacell 100. Resource 350 is representative of various processors within megacell 100. Each resource 340, 350 typically has its own associated R-ID register; however, various embodiments may choose to provide resource ID registers for only a selected portion of the resources. A task ID is provided by a task-ID register, such as task-ID register 344a associated with resource 340 and task-ID register 344n associated with resource 350. A task register associated with a non-processor resource, such as DMA, a coprocessor, etc, is loaded with a task value to indicate the task that it is supporting.

In another embodiment, only processor resources 340, 350 that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task_ID registers are not necessarily part of the resource core and can be located elsewhere in the system, such as a memory mapped register for example, and associated to a resource bus. The only constraint is that a task_ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values.

Referring still to FIG. 3A, each TLB entry includes a virtual address field 305 and a corresponding physical address field 308 and address attributes 309. Various address attributes are described in Table 1 and Table 2. Address attributes define conditions or states that apply to an entire section or page of the address space that is represented by a given TLB entry. An S/P field 306 specifies a page size such as 64 kB and 4 kB for example. Naturally, the page size determines how many most significant (ms) address bits are included in a check for an entry.

Each TLB entry also includes "shared" bit 303 and a lock bit 304. All entries marked as shared can be flushed in one cycle globally. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable the compare logic with their associated field.

As mentioned earlier, the resource ID field and task ID field in each entry of the TLB/μTLB can be used to improve security. During program task execution, each transaction request is checked by the miss control circuitry of the TLB/μTLB to determine if the entry is allowed for a specific resource or for all resources and for a specific task or for all tasks. For example, if a request is received and a valid entry is present for the proffered virtual address but a task ID or R-ID which accompany the request does not match the corresponding valid task ID and R-ID fields of the entry, then a miss is declared. If the task ID and/or R-ID fields of the entry are marked as invalid, then they are ignored.

Figure 3B:
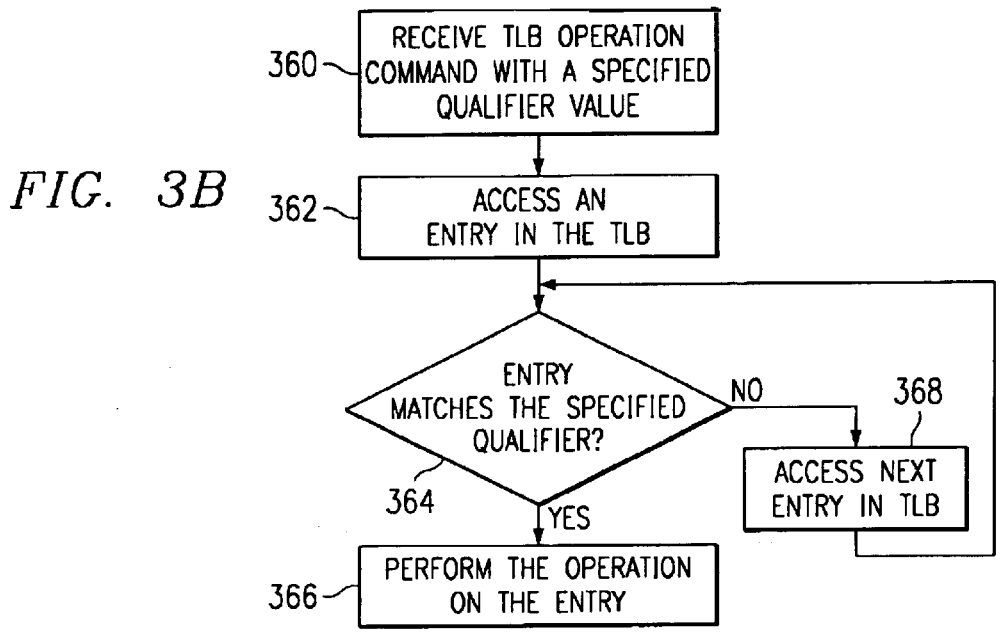
FIG. 3B is a flow chart illustrating a method of operating the TLB of FIG. 3A.

FIG. 3B is a flow chart illustrating a method of operating the TLB of FIG. 3A. As discussed above, the TLB is filled during the normal course of action by a set of translated address entries along with qualifier fields that are incorporated with each entry. As will be described in more detail below, operations can now be performed on the TLB that are qualified by the various qualifier fields.

In step 360, an operation command is received by the control circuitry of the TLB. This command is sent by the MMU manager during the course of operation. Commands are sent as needed to flush (invalidate), lock or unlock selected entries within the TLB. These operations will be described in detail later.

Step 362 accesses a first entry in the TLB and reads the qualifier field specified by the operation command. This can be task ID field 302, resource ID field 301, shared indicator 303, or combinations of these. Operation commands can also specify a selected virtual address entry.

Step 364 compares the qualifier specified by the operation command with the qualifier field read from the TLB entry. If they match, then the operation is performed on that entry in step 366. If they do not match, then the next entry is accessed in step 368 and compare step 364 is repeated for the next entry.

Step 366 performs the operation specified in the operation command on each entry whose qualifier field(s) match the operation command. In this embodiment, the operation can invalidate an entry by resetting valid bit field 307, and lock or unlock an entry by appropriate setting of lock bit 304.

Step 368 access each next TLB entry until all entries have been accessed. In this embodiment, all μTLBs associated with a shared TLB are also accessed as part of the same operation command.

Other embodiments may provide additional or different operations that are qualified by the qualifier fields of the present embodiment or by additional or other types of qualifier fields. For example, resource type, power consumption, processor speed, instruction set family, and the like may be incorporated in the TLB and used to qualify operations on the TLB.

Figure 4:
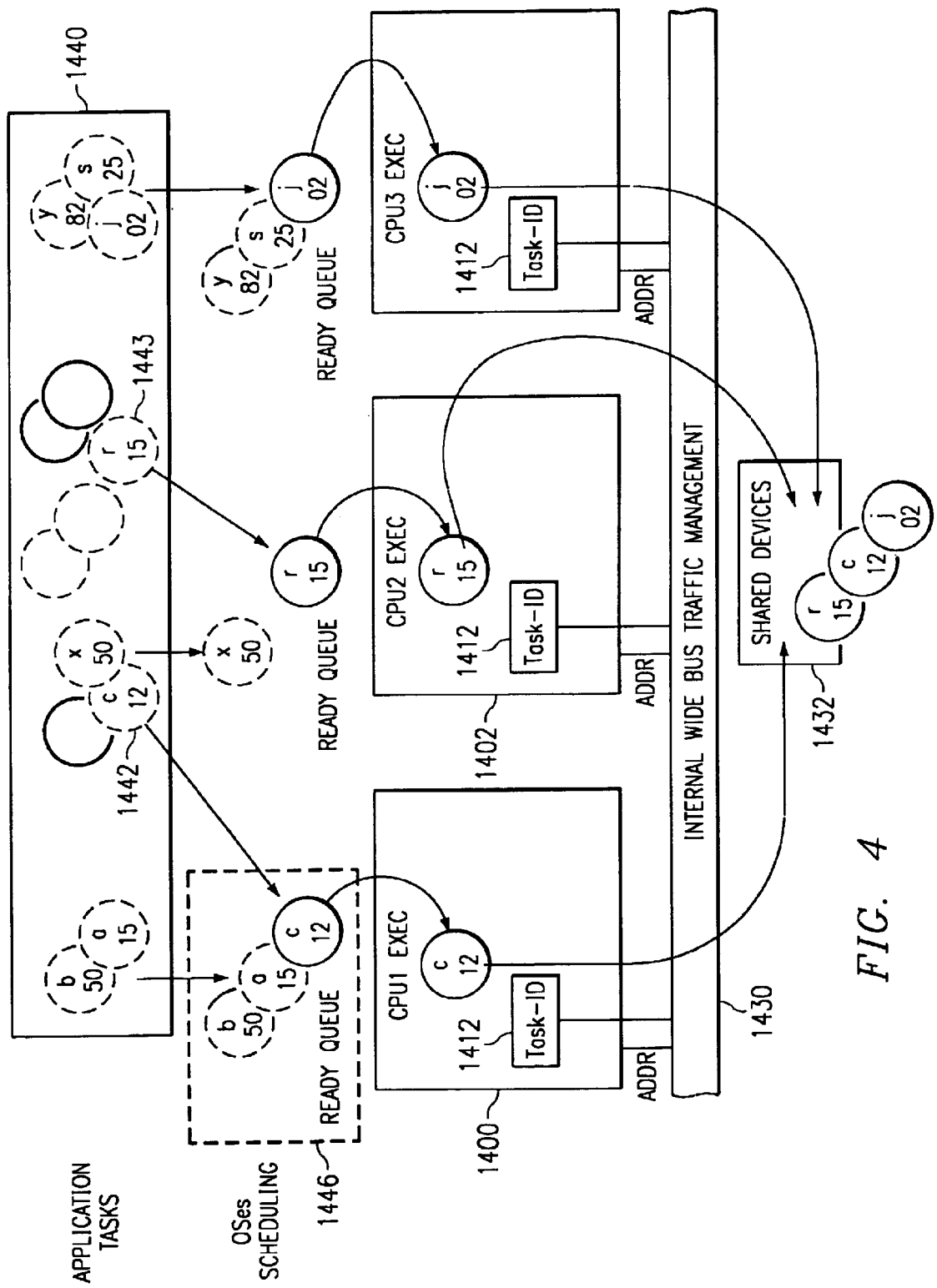
FIG. 4 is a block diagram of a digital system similar to FIG. 1 illustrating a cloud of tasks that are scheduled for execution on the various processors of the digital system.

FIG. 4 is a block diagram of a digital system similar to that of FIG. 1 illustrating cloud of tasks that are scheduled for execution on the various processors of the digital system. Typically, each software task includes a task priority value that is commonly used by an operating system to schedule an order of execution for a set of pending tasks 1440.

In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. The Task ID register in each processor is loaded when a task is invoked.

Table 3 illustrates several portions of instruction code sequences in which a task is spawned. From line 1 to line 5, task "c" is active and spawns a new task, "audio" on line 5. The kernel is then invoked to instantiate the new task and create the associated TCB. An eight bit (numbers of bits can be more or less) task-Id ID field is memorised in the TCB at line 11. During the context switch (reschedule in line 13) before launching the "audio" task, the kernel loads task-ID register 1412 with the task-ID value held in the TCB (Table 4) or in another table. At line 14, the new task is now active.

TABLE 3

Setting Task ID at the Start of a Task

```
1   // (Task c code execution)
2   Instruction 1
3   ------
4   instruction n
5   Taskspawn("audio",
      200,0,5000,
      (FUNCPTR)audio,//
      (Task ccode execution:
      instruction n+2)
6                               //(Kernel code execution)
7                               -----
8                               TaskCreate()
9                                 //(taskcreate code execution)
10                                ------
11                                SetTaskAttributeID(TID)
12                                -------
13                              // Kernel reschedule code execution
14  //(Task Audio code execution)
15  Instruction 1
16  -------
```

Table 4 is an example task control block that is used to define a task-ID. Typically, the OS uses a 32-bit task-ID that is in fact an address that enables the OS to locate task information (TCB). At line 4, an execution priority value is defined that is used by the operating system to schedule execution of the task. At line 5, a task-ID value is defined that is used to set the task ID register when the task is instantiated.

TABLE 4

Setting Task ID Using a TCB

```
1    TCB (task control block)
2    Typedef struct TCB
3    {
4      UINT OS-priority
5      UINT Task_ID
6      ---
7      #if CPU_FAMILY == xx
8      EXC_INFO excinfo;
9      REG_SET regs;
10     . . .
11     #endif
12   }
```

In other embodiments, other means than a TCB may be provided for storing the task ID.

Referring again to FIG. 3A, task-ID field 302 can be set in response to information provided at line 5 of the TCB illustrated in Table 4. This information can be used directly by the MMU manager when loading a new entry in TLBs. This information could also be part of the page table descriptor in the MMU page table and loaded as part of the MMU software table walk.

In the present embodiment, task-ID information is not maintained in page tables but is inserted by the TLB miss handler at the time of a TLB fault by using the task_ID value of the transaction request that caused the TLB fault. Other embodiments may use other means for setting the task-ID field in the TLB entry, such as by storing this information in a separate table or in the MMU page tables, for example. In the present embodiment the Valid bit associated with the task-ID field is loaded through the MMU table walk and is part of the MMU tables. Thus, when the TLB miss handler accesses a page table in response to a TLB miss, it queries the task-ID valid bit field of the MMU page table; if this bit field is asserted, then the TLB miss handler asserts the task-ID valid bit in the TLB entry and loads the task-ID value from the task-ID register of the requester that caused the TLB miss into task ID field 302. If the task-ID valid bit field of the MMU page table is not asserted, then the TLB miss handler deasserts the task-ID valid bit in the TLB entry and the task-ID value from the task-ID register of the requester that caused the TLB miss is ignored.

In the present embodiment, the shared bit field 303 is loaded through the MMU table walk and is part of the MMU tables. Typically, shared pages are defined by the OS in response to semaphore commands, for example.

In another embodiment, shared bit information is not maintained in page tables but is inserted by the TLB-miss handler at the time of a TLB fault by accessing the TCB directly based on the task ID of the request that caused the fault. The TCB is located by the TLB-miss handler via a look-up table keyed to the task ID value. Other embodiments may use other means for setting the shared bit in the TLB entry by storing this information in a separate table, for example.

R-ID field 301 is set by using the R-ID of the request that caused the fault. A Master CPU could also load value in this field during the programming of a TLB entry by taking this information from the MMU tables or separate tables, for example.

Figure 5:
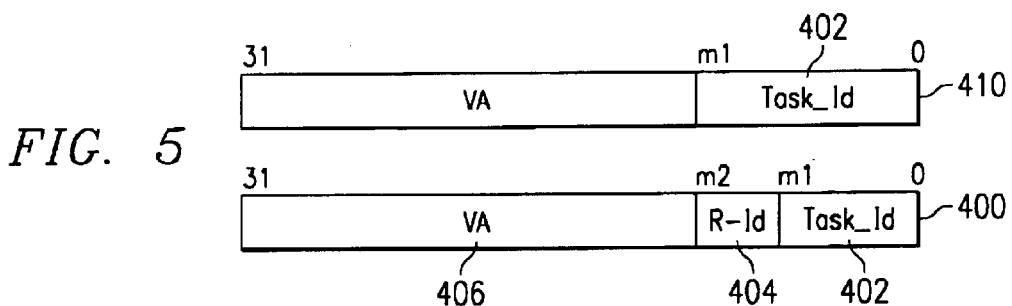
FIG. 5 illustrates a TLB control format used to operate on the TLB and $\mu$TLBs of FIG. 3A.

FIG. 5 illustrates a TLB control word format used to operate on the TLB and μTLBs of FIG. 3A in response to control operations as defined in Table 5. TLB control word format 400 includes a task-ID field 402, resource-ID field 404 and virtual address field 406. Note that the virtual address field refers to a page address, therefore lsb address bits that refer within a page are not needed. In some embodiments, certain of the processors might not be allowed to invalidate entries other than their own.

As described previously, during execution of a program, the R-ID and Task-ID field comes from a register associated with a requester during each memory system access request. In a system embodiment with multi-processors with multiple independent Operating Systems (OS), the R-ID is static and indicates which of the resources is accessing a given location (address). The Task-ID indicates which of the tasks (or processes) of this resource is doing the access. The task ID is dynamic and changes on each context switch. For these systems, restricting operations on a system TLB to the associated resource is important to optimize the main system TLB usage. Each OS controls the TLB entries it uses.

However, another system embodiment might be controlled by middleware that supports a unified task and memory management. For those, the notion of R-ID might disappear and be treated as part of the task_ID. Restriction of TLB command based on R-ID would not be necessary in those systems and the field R-ID could be re-used to extend the task-ID field. In that case, TLB control format 410 may be used in which the R_Id field is not needed. Recall that the R-ID of the requester is provided with each transaction request, therefore control operations specified using format 410 can be confined to entries associated with the requestor.

A processor can initiate various control operations on a TLB by writing a control word conforming to appropriate format to a specific memory mapped address associated with TLB controller 320. This control word can specify a target virtual address entry and an associated task ID or an associated resource ID. Depending on the operation, unneeded fields are ignored. For example, the operation "invalidate all entries related to an R-ID" will only use the R-ID field 404. The format and type of operation can be distinguished by using different memory mapped addresses, for example.

Each address corresponds to a different TLB operation. Another embodiment would be to use a different processor instruction opcode for each of the TLB operation that would drive the appropriate control signal connected to TLB controller 2232. A state machine in TLB controller 320 then executes the requested control operation. These TLB control operations are listed in Table 5. These operations are described in more detail below. For many of the operations, certain processors in an embodiment will be restricted to only affecting their own entries. This restriction is enforced by using the resource-ID signals 2106 provided with each write to TLB controller 320 as part of each memory access request.

TABLE 5

TLB Control Operation

Invalidate entry with VA
Invalidate all entries related to a Task-ID
Invalidate all entries related to a R-ID
Invalidate all shared entry
Invalidate all entries of a task except shared
Invalidate All entries
Lock/UnLock entry
Lock/Unlock all entries related to a task-ID/R-ID
Read TLB entry
Write TLB entry
Check and select victim TLB entry
Set victim TLB entry In another embodiment, the control operations can be invoked by executing an instruction that invokes a hardware or software trap response. As part of this trap response, a sequence of instructions can be executed or a control word can be written to a selected address, for example. In another embodiment, one of the processors may include instruction decoding and an internal state machine(s) to perform a TLB or Cache control operation in response to executing certain instructions which may include parameters to specify the requested operation, for example.

For an "invalidate entry" operation, a Virtual page address (VA) is provided in VA field 406 of the control word and the other fields of the control word are ignored. This generates an entry invalidate operation on the corresponding virtual address entry. Note that all processors of a given megacell embodiment might not be allowed to invalidate entries others than their own. In that case, the R-ID value from the R-ID register of the requester is used to qualify the operation.

For an "invalidate all entries related to a task" operation, all entries corresponding to the provided task identifier are invalidated. This allows a master-processor to free space from the shared TLB by invalidating all entries of a task belonging to another processor. In this case, the control word provides a task-ID value and an R_ID value. Processors other than the master-processor can free space from the shared TLB by invalidating all entries of one of its own tasks. This operation invalidates all the entries corresponding to the provided task and resource identifier or to a task of the resource requesting the operation. The R-ID value from the R-ID register of the requestor is used to qualify the operation.

For an "invalidate all entry related to a Resource" operation, all entries corresponding to RID field 404 of the control word are invalidated. Note that all processors of a given megacell embodiment might not be allowed to invalidate entries other than their own. This provides, however, the capability to a master processor to free space from the shared TLB by invalidating all entries of another processor. The R-ID value from the R-ID register of the requestor is used to qualify the operation.

For an "invalidate all shared entries" operation, all entries in the TLB marked as shared for the requester are invalidated. The R-ID register value limits the effect of this operation, as discussed above.

For an "invalidate all entries of a task except shared entries" operation, all entries in the TLB for a task specified in the control word not marked as shared for the requester are invalidated. The R-ID value from the R-ID register of the requester limits the effect of this operation, as discussed above.

For an "invalidate all entries" operation, all entries in the TLB matching the R-ID of the requester are invalidated. For the master CPU, the operation invalidate all entry regardless of the R-ID. If all of the R-ID registers distributed in the system have the same value, then this operation invalidates all entries.

For a "lock/unlock entry" operation, a control word is written providing the VA which needs to be locked/unlocked. This operation sets or resets lock field 304 in the selected entry. Restriction on R-ID applies as above.

For a "lock/unlock all entry related to a task" operation, a control word is written providing the task identifier which needs to be locked/unlocked. Restriction on R-ID applies as above.

In the case in which an independent OS is running on each processor, each OS can initiate the above operations. In that case, these operations must be restricted to entries with a resource identifier (R-Id) belonging to the requester.

In the case of a single master OS, task and memory management can be viewed as unified, removing the need for an R-Id. The R-ID can be an extension of the task-ID. In an embodiment, in which the R-ID is hard-coded, the field R-ID in the TLB simply needs to be disabled (associated Valid bit is cleared) via a configuration control register. Disabling the R-ID is equivalent to having a single R-ID for all the system or for part of the system.

As mentioned above, a global control bit can be used in an embodiment to determine if all the above functions must be limited to the entry corresponding to the resource ID requesting the operation.

Although it is preferable to have the same page size for memory management on all processors, it is not mandatory. In a shared system, the TLB supports all page sizes of the system, in response to S/P field 306. Therefore, in a different embodiment, a TLB may support a different set of page sizes.

Table 5 also lists some additional operations that are provided which allow a software TLB handler to access the shared system TLB: Read TLB entry, Write TLB entry, Check and select victim TLB entry, and Set victim TLB entry. These are described in more detail below.

For a "Read TLB entry" operation, an entry in the TLB pointed to by the victim pointer is transferred into TLB entry register 330. The TLB entry register can then be read and analyzed by the software TLB handler. Again this operation might be restricted to the master CPU for security.

For a "write TLB entry" operation, the contents of the TLB entry register is transferred to a selected victim entry of the TLB.

The "check and select victim TLB entry" operation has multiple functions. Its first purpose is to determine an index value for the replacement of an entry. However, it can also be used to find out if an entry is already in the TLB. The R_ID & Task_ID & VA fields of a corresponding entry are checked for a match against a proffered virtual address entry.

If there is no match, then the victim pointer is positioned according to the chosen replacement algorithm. This replacement can be random, cyclic, etc. The second usage is to verify if a given page is present in the TLB. If a matching entry is found, the victim entry points to this matching entry, and a flag bit in the status register is set to indicate this condition.

The "Set victim TLB entry" operation allows the software TLB handler to select a particular entry as the next victim. This is useful to support certain lock mechanisms software replacement algorithms.

As indicated earlier, each control operation is performed by a state machine within TLB control circuitry 320 in response to writing to a selected memory mapped address. For example, for the operation "invalidate all entries related to a task", all entries with a matching task-id TAG are invalidated in response to a single command, including the shared TLB and the associated $\mu$TLBs. In the present embodiment in which the TLB is a fully associative memory, the operation can be done in one cycle or as a loop as most appropriate.

As mentioned above, control operation affect the shared TLB and the associated $\mu$TLBs for the various operations based on task-ID, resource-ID and shared bits. In an embodiment in which both uTLBs and TLB are fully associative, the flush and/or Lock/unlock can be done by the same command in the same cycle. But if the uTLB is fully associative and TLB is set associative, for example, a single command is still used, but the operation into the set associative TLB will be executed entry by entry by a HW loop. This will take longer time. If both the uTLB and TLB are fully associative there will typically be a single control block. If the uTLB is fully associative and TLB set associative, there may be separate control blocks 320, but the same command effects all of the control blocks. Alternatively, an embodiment may require sending copies of the operation command separately to each of the separate control blocks.

Figure 6:
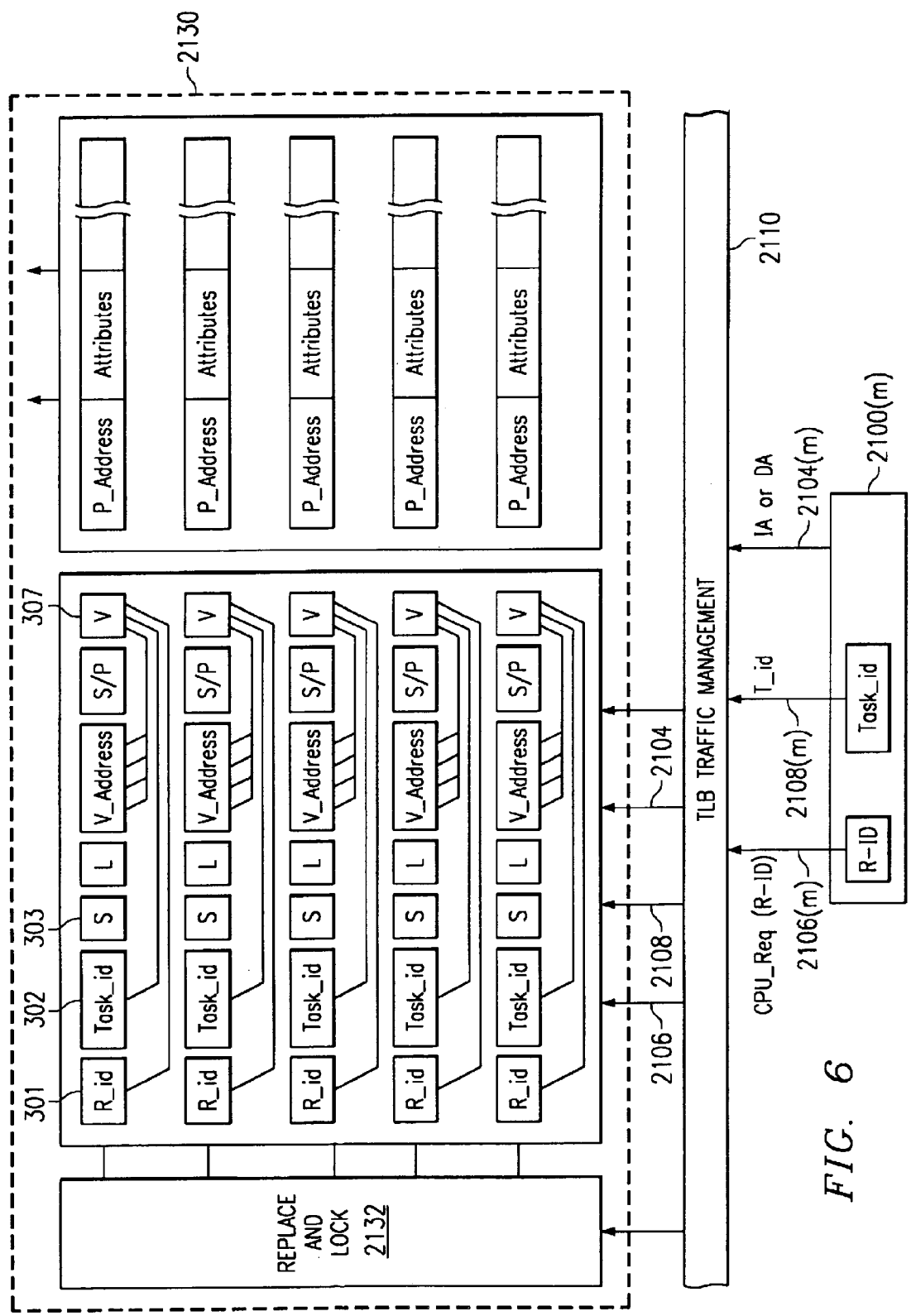
FIG. 6 illustrates operation of the TLB of FIG. 3A for selective flushing of an entry for a given task or resource.

FIG. 6 is a simplified block diagram of the TLB of FIG. 3A and will now be referred to explain selective invalidation of an entry for a given task or resource, as listed in Table 5. Processor 2100(m) is representative of one or more requesters that access TLB 2130. A physical address bus 2104(m), resource ID signals 2106(m), and task ID signals 2108(n) are provided by each processor 2100(n) for each TLB request. Traffic controller 2110 provides request priority selection and sends the highest priority request to TLB 2130 using physical address bus 2104, resource ID signals 2106, and task ID signals 2108 to completely identify each request.

A task-ID field 302 and/or a resource ID field 301 stored as independent fields in the TLB TAG array is used to selectively invalidate (flush) all entries of a given task or a given resource (requester). A state machine within control circuitry 2132 receives a directive from a processor to perform an invalidation operation, as described above. The operation directive specifies which task-ID is to be flushed using format 400 or 410 (see FIG. 5).

For operations which use task ID field 402 in the control word, state machine 2132 accesses each entry in TLB 2130, examines the task-ID field, and if there is a match that entry is flushed by marking the valid bits in its valid field 307 as not valid. Thus, a single operation is provided to flush all entries of a given task located in a TLB. As discussed above, in this embodiment, the TLB cache is made of several levels of set associative TLB and $\mu$TLB, and all levels are flushed simultaneously in response to a single operation directive command by accessing each entry sequentially in a hardware controlled loop.

For operations which use both task ID field 402 and R-ID field 404 in the control word, state machine 2132 accesses each entry in TLB 2130, examines the task-ID field and the resource ID field, and if there is a match in both the task ID and R-ID fields that entry is flushed by marking all valid bits in its valid field 307 as not valid. Advantageously, this allows discrimination of entries belonging to tasks from different resources that have the same task ID number. When the R-ID valid bit is set, an entry is not flushed if its R-ID field 301 does not match the value provided on R-ID signals 2106. This operation only invalidates entries with a valid task-ID.

In a similar manner, the selective invalidation operation "Invalidate all entries related to a R-ID" is performed by examining the R-ID 301 field of each entry and if there is a match in the R-ID field that entry is flushed by marking its valid field 307 as not valid. This operation only invalidates entries with a valid R-ID.

Likewise, the selective invalidation operation "Invalidate all shared entries" is performed by examining the share field 303 of each entry and if there is a match in the shared field that entry is flushed by marking its valid field 307 as not valid. All entries marked as shared can be flushed in one cycle.

In the present embodiment, when shared entries are flushed, state machine 2132 ignores the task ID field since shared page entries may be used by different tasks having different task IDs. In an alternative embodiment, shared entry flushing could also be qualified by the task ID field. Alternatively, shared entry flushing could also be qualified by the task ID field, but only if the task ID valid bit in valid field 307 is asserted indicating a valid task ID value is in field 302.

Figure 7:
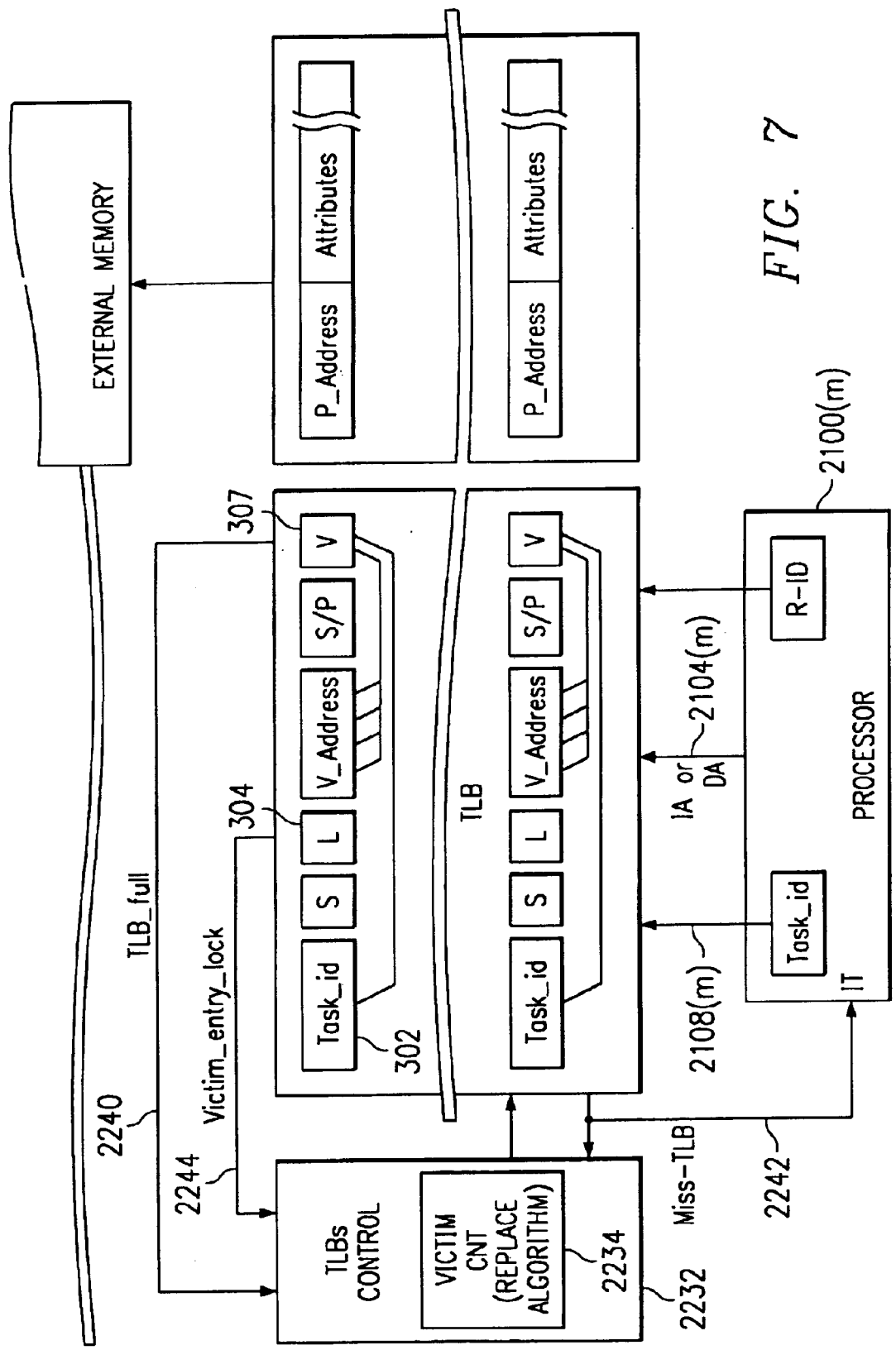
FIG. 7 illustrates control circuitry for adaptive replacement of TLB entries in the TLB of FIG. 3A.

FIG. 7 is a simplified block diagram of the TLB of FIG. 3A and will now be referred to explain selective lock/unlocking of an entry for a given task or resource, as listed in Table 5. Advantageously, in this multi-processor system with system shared TLB, an innovative scheme of adaptive replacement is provided for controlling the TLB on a task basis, as discussed above. In order to support such a function in the most optimized way, an adaptive replacement algorithm taking into account locked entries and empty entries is provided. TLB full signal 2240 is asserted when one or more valid bits in field 307 is asserted for each TLB entry location. TLB miss signal 2242 is asserted to indicate a miss occurred in response to a transaction request from processor 2100(m), which invokes a TLB handler as described earlier.

When the TLB is full with no locked entries, pseudo-random replacement based on a simple counter (Victim CNT) 2234 is used to select the victim entry. Another embodiment would be to keep a pseudo random replacement and to check the lock bit on a miss. If it is locked, signal 2244 is asserted and the victim counter is incremented further until a non-locked entry is found. This is done automatically by the control circuitry connected to victim counter 2234 so that response time of the TLB handler routine is not impacted.

When the TLB is not full, the victim counter is incremented until an empty entry is found. This is done automatically by the control circuitry connected to victim counter 2234 so that response time of the TLB handler routine is not impacted.

After a flush entry operation is performed, the victim "counter" is updated with the location value of the flushed entry and stays unchanged until a new line is loaded in order to avoid unnecessary searching.

An alternative implementation provides the capability to do the victim entry search instantaneously by providing in an external logic the lock and valid bit or by using a CAM, for example. In another alternative embodiment, a shift register and associated circuitry is used to point to the next location in the TLB that is either not valid or valid and not locked.

Figure 8A:
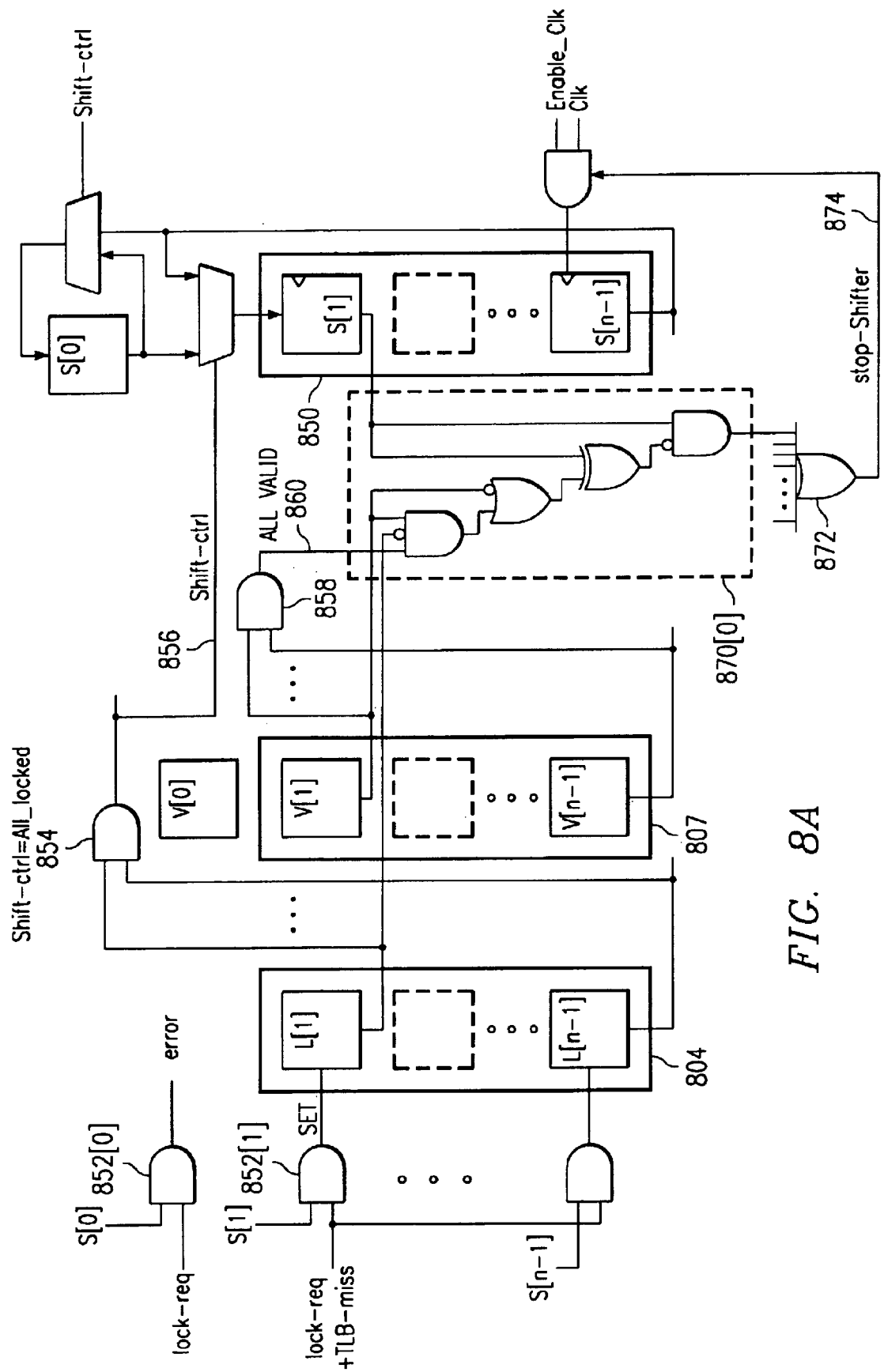
FIG. 8A is a schematic illustrating an alternative embodiment of control circuitry that utilizes a shift register for adaptive replacement of TLB entries in the TLB of FIG. 3A.

FIG. 8A is a schematic illustrating an alternative embodiment of victim selection circuitry 2234 that utilizes a shift register for adaptive replacement of TLB entries in the TLB of FIG. 3A. Shifter 850 is used to point to the next location in the TLB that is either not valid or valid AND not locked. Assuming the TLB has n entries, shifter 850 has only n−1 positions. Position zero of the TLB is reserved as a victim location when all entries are valid and all entries 1 to n−1 are locked.

Lock bits 804 are equivalent to lock field 304 of FIG. 3A, except they are implemented as individual storage bits rather than as part of a TLB memory array so that they can be monitored by reservation circuitry comprising AND gate 854 to form a shift control signal 856 that is asserted when all of the monitored lock bits are asserted. Also, the individual lock bits can be set by individual gates 852[x] in response to a lock operation. When signal 856 is asserted, only entry location S[0] is available. If the shifter indicates S[0] and a lock request occurs, an error is signaled to the CPU by gate 852[0]because the position S[0] is reserved as unlockable. The TLB miss handler in the OS can then decide to remove one of the already locked entries in order to lock this new one.

Valid bits 807 are equivalent to the VA valid bit of valid field 307 of FIG. 3A, except they are implemented as individual storage bits rather than as part of a TLB memory array so that they can be individually monitored by AND gate 858 to form an "all valid" control signal 860 that is asserted when all of the monitored valid bits are asserted.

During operation, shifter 850 has one bit set to one, such as bit S[1], and all the other bits set to zero selecting the S[1] entry as a candidate victim entry. If either the S[1] entry is not valid V[1]=0 or all entries are valid and the S[1] entry is not locked (all_Valid AND V[1]=1 AND L[1]=0), as determined by skip circuit 870[1], the shifter stops with a stop_shifter signal 874 asserted. Signal 874 is provided by OR gate 872 which receives outputs from each of a set of skip circuits 870[x] connected to each of valid bits 807 V[1]–V[n−1]. In this case, entry S[1] is selected as the next victim entry.

Otherwise, the shifter continues its search. S[2] is set and all the other bits of the shifter are zero. The same condition is checked for S[2] position and if true, the shifter stops on the victim entry 2. Otherwise, the shifter continues until an unlocked entry is found and selected. By doing one check per clock cycle, the shifter stops on the first sequential position it finds available for replacement.

The shifter starts (enable_clk=1) a search after each new load entry (TLB-miss). Advantageously, the latency to find the victim entry is therefore hidden due to TLB-miss occurrence and the time required to handle the TLB-miss, which may be many CPU cycles.

Still referring to FIG. 8A an embodiment is illustrated that has one reserved unlockable entry. Other embodiments may have several unlockable entries reserved (m). In that case, once n-m entries are locked (all-locked=true), the victim entry selection iterates cyclically between 0 and m−1.

The position S[0] reserved in case of all_locked case is not really used, meaning that the TLB size is really n−1. An alternative embodiment would be to have a shifter with n location to avoid losing any entry. Lock request on unlockable entry zero (S[0]) would raise a flag and position the victim pointer on the first unlocked entry. The CPU can then read the content of the victim location and decide to use this entry to lock the desire entry. This would add potential latency on lock operation but remove the loss of TLB entries.

Another alternative implementation to avoid loss of a TLB entry is to execute the all-taskid-unlocked operation as a loop of n. In that case, a "locked-counter" can be used to detect if more than n-m entries are locked and to thereby keep m entries unlocked. Every new lock entry request increments the locked-counter. The locked-counter is decremented through the all-task-id-unlocked loop.

Figure 8B:
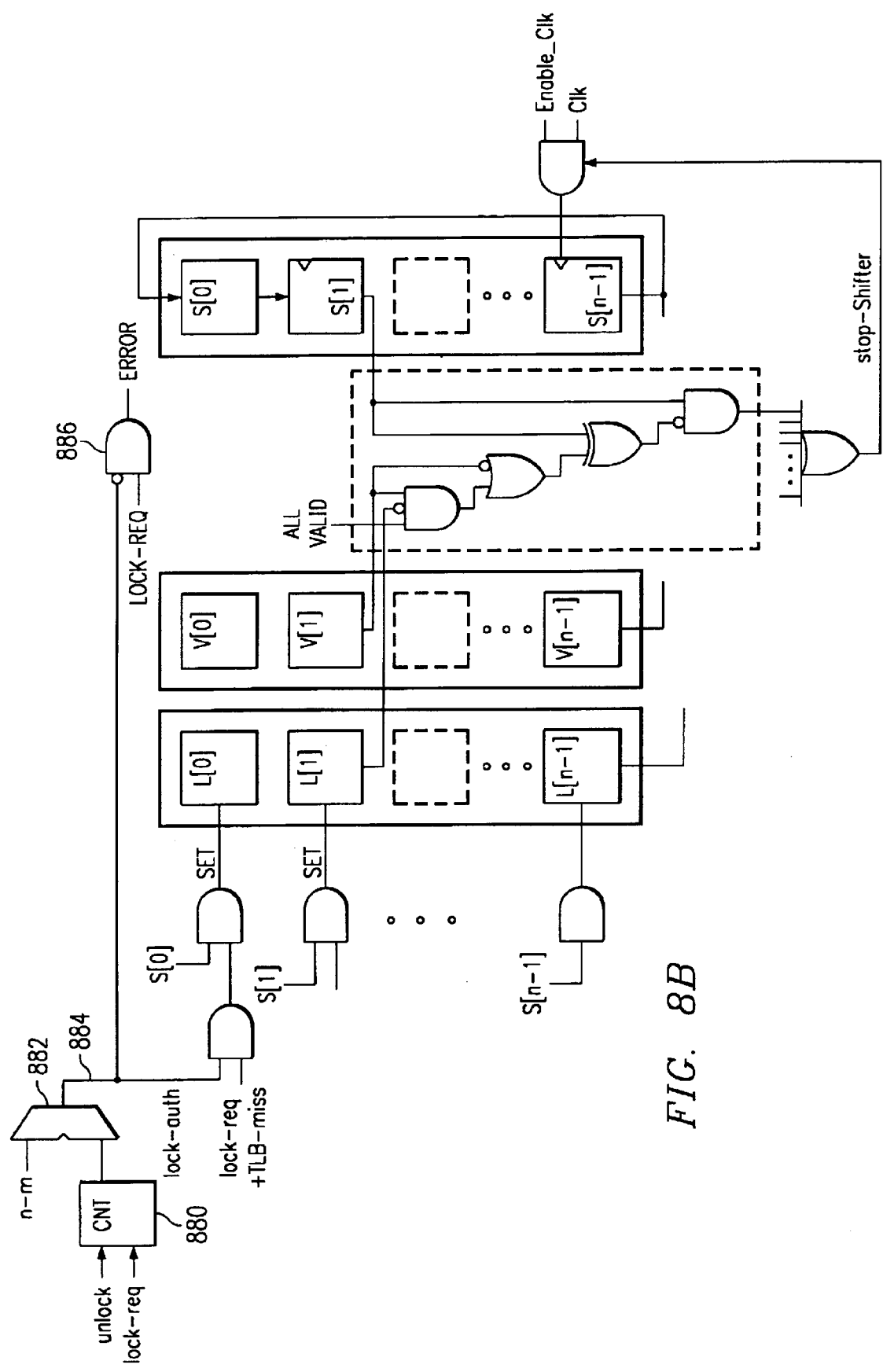
FIG. 8B is a schematic illustrating an alternative embodiment of the control circuitry of FIG. 8A.

FIG. 8B is a schematic illustrating an alternative embodiment of the control circuitry of FIG. 8A using reservation circuitry comprising a locked-counter 880 and comparator 882. Signal lock-auth(orized) 884 remains asserted as long as the count value is less than n-m. In this implementation unlock operation takes n cycles, but no TLB entry is lost. If a new lock request occurs once lock_auth is cleared, the new entry is not locked, but gate 886 asserts an error signal that can set a flag or an interrupt error can be returned to the CPU. The OS lock-error handler can then decide if another entry can be unlocked to let the new one be locked.

In this embodiment, lock bits L[n] can be part of the TLB cache memory instead of discrete logic because all lock and unlock operation are done one entry at a time (selected by the shifter). Similarly, if an a up-down counter is provided to generate the all_valid signal, then the V[n] bits can also be part of the TLB memory. The skip logic can be reduced to a single set on the output of the memory and the OR 872 is removed.

Referring again to FIG. 7, the function "Lock/Unlock all entries of a given task" listed in Table 5 is implemented by the comparison of the task-id field 302 of each entry in the TLB. If this field matches a task-id value 402 supplied in the control word (see FIG. 5), the entry is locked by setting the associated lock bit 304 or unlocked by clearing the associated lock bit 304 of each matching entry depending on the requested operation. In an embodiment of a TLB implemented with a memory array, the function is done through a hardware loop using a finite state machine located in control circuitry 2232, for example. In an alternative embodiment of a TLB implemented with a content addressable memory (CAM), all entries with the same task-ID can be locked or unlocked in one cycle.

As discussed above, lock/unlock request are restricted as mentioned above by the R-ID provided on signals 2106. When R-ID field 301 does not match the value provided on R-ID signals 2106 the entry is not locked/unlocked.

Thus, Lock/unlock operation on the TLB based on task-ID and optionally qualified by R-ID is provided. A pseudo-random replacement algorithm for the TLB is changed into a sequential replacement algorithm upon detecting an empty entry location or a locked victim entry location.

Digital System Embodiment

Figure 9:
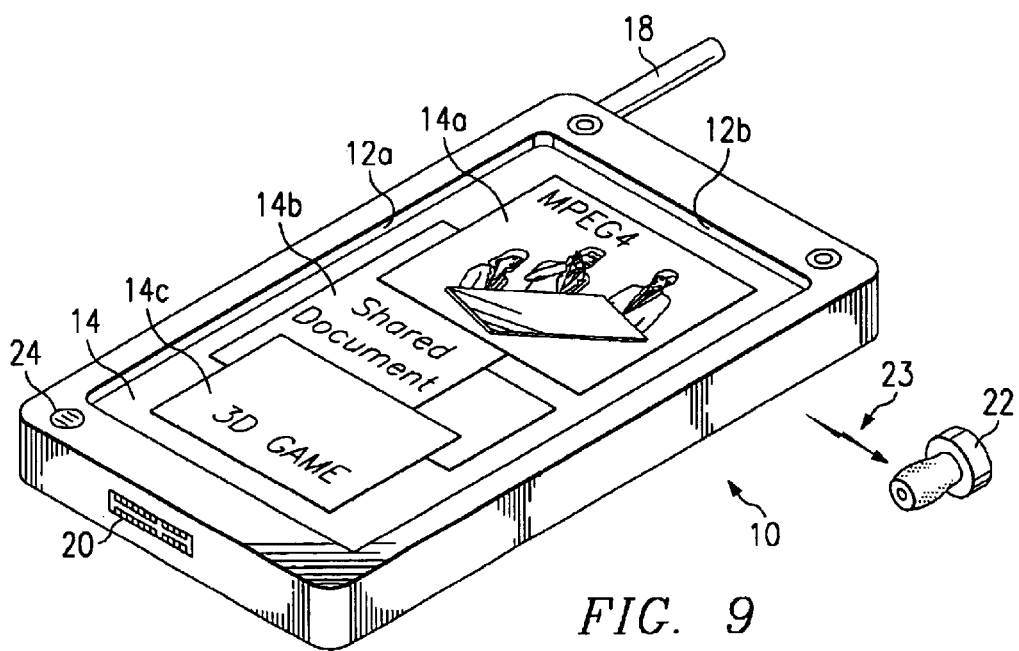
FIG. 9 is a representation of a telecommunications device incorporating an embodiment of the present invention.

FIG. 9 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 9, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136.

Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to ear piece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the TLB may be limited to a single processor and not shared, or it may include only a single level without $\mu$TLBs.

In another embodiment, the TLB may be controlled by other means than a state machine controller, such as directly by an associated processor, for example.

In another embodiment, there may be several distinct MMUs with associated TLBs, wherein certain of the TLBs may include aspects of the invention and certain others may not.

It is therefore contemplated that the appended claims will cover any such modifications of the embodiments as fall within the true scope and spirit of the invention.

What is claimed is:

1. A method of operating a digital system having a processor and associated translation lookaside buffer (TLB), comprising the steps of:

executing a plurality of program tasks within the processor;

initiating a plurality of memory access requests in response to the plurality of program tasks;

caching a plurality of translated memory addresses entries in the TLB responsive to the plurality of memory access requests;

incorporating a task identification value with each translated memory address to identify which of the plurality of program tasks requested the respective translated memory address; and locking or unlocking a set of two or more entries in the TLB responsive to an operation command, where the set is defined at least in part by the task identification value, such that only an entry associated with a selected program task is affected.

2. The method according to claim 1, wherein the step of locking or unlocking comprises locking or unlocking only and all of the entries associated with the selected task identification value.

3. The method of claim 2, wherein the TLB has several levels, and wherein the step of locking or unlocking encompasses all of the several levels of the TLB.

4. The method according to claim 3, further comprising the step of incorporating a second qualifier value with each translated memory address; and wherein the step of locking or unlocking comprises the step of locking or unlocking a set of two or more entries, where the set is defined by both the task identification value and the second qualifier value.

5. The method of claim 4, wherein the digital system has a plurality of processors and wherein the second qualifier value identifies which of the plurality of processor requested the respective translated memory address.

6. The method according to claim 5, further comprising the step of replacing a selected victim translated memory address with a different translated memory address, wherein the victim translated memory address is selected only from a portion of the entries in the TLB that is not locked.

7. The method according to claim 6, further comprising the step of reserving a portion of the entries from being locked.

8. A digital system having a translation lookaside buffer (TLB), the TLB comprising:

storage circuitry with a plurality of entry locations for holding translated values, wherein each of the plurality of entry locations includes a first field for a translated value and a second field for an associated qualifier value;

a set of inputs for receiving a translation request;

a set of outputs for providing a translated value selected from the plurality of entry locations; and control circuitry connected to the storage circuitry, wherein the control circuitry is responsive to an operation command to lock or unlock a selected set of two or more entry locations which have a first qualifier value in the second field.

9. The digital system of claim 8, wherein the digital system further comprises a second level TLB connected to the TLB, the second level TLB comprising:

second level storage circuitry with a plurality of entry locations for holding translated values, wherein each of the plurality of entry locations includes a first field for a translated value and a second field for an associated qualifier value; and wherein the control circuitry is connected to the second level storage circuitry, the control circuitry being responsive to an operation command to lock or unlock selected ones of the plurality of entry locations in the second storage circuitry which have a first qualifier value in the second field, such that qualified entry locations in the TLB and in the second level TLB are locked or unlocked in response to a single operation command.

10. The digital system according to claim 8, wherein each of the plurality of entry locations in the storage circuitry contain a third field for a second associated qualifier value, and wherein the control circuitry is responsive to an operation command to lock or unlock selected ones of the plurality of entry locations which have both a specified task ID value in the second field and a specified requester resource ID value in the third field.

11. The digital system according to claim 8, wherein the control circuitry comprises:

a shift register connected to the storage circuitry for selecting a next victim entry location; and skip circuitry connected to the shift register and to the storage circuitry, the skip circuitry operable to cause the shift register to skip over locked entry locations.

12. The digital system according to claim 8, wherein the control circuitry comprises reservation circuitry operable to reserve a portion of the entry locations from being locked.

13. The digital system according to claim 8 being a personal digital assistant, further comprising:

a processor (CPU) connected to the TLB and thereby connected to access a memory circuit;

a display, connected to the CPU via a display adapter;

radio frequency (RE) circuitry connected to the CPU; and an aerial connected to the RF circuitry.

* * * * *